United States Patent [19]
Kaplan

[11] 3,868,117
[45] Feb. 25, 1975

[54] RECORD CLEANING MECHANISM

[76] Inventor: Lawrence R. Kaplan, 56 Carver Ter., Yonkers, N.Y. 10710

[22] Filed: Aug. 10, 1973

[21] Appl. No.: 387,394

[52] U.S. Cl. .................................................. 274/47
[51] Int. Cl. ............................................. G11b 3/58
[58] Field of Search ......................................... 274/47

[56] References Cited

UNITED STATES PATENTS

| | | | |
|---|---|---|---|
| 1,529,507 | 3/1925 | Runk | 274/47 |
| 3,203,701 | 8/1965 | Rosenthal | 274/47 |
| 3,218,082 | 11/1965 | Taylor et al. | 274/47 |

FOREIGN PATENTS OR APPLICATIONS

| | | | |
|---|---|---|---|
| 817,598 | 8/1959 | Great Britain | 274/47 |

*Primary Examiner*—Richard E. Aegerter
*Assistant Examiner*—John W. Shepperd
*Attorney, Agent, or Firm*—Blum, Moscovitz, Friedman & Kaplan

[57] ABSTRACT

A record cleaning mechanism suitable for co-acting with an automatic (or manual) tonearm. Cueing means are disposed on a record cleaning mechanism to allow the cleaning mechanism's arm to be controlled by an automatic (or manual) tonearm during the changing of positions thereof, yet operate independently of the tonearm when the stylus is tracking the record.

10 Claims, 11 Drawing Figures

RECORD CLEANING MECHANISM

BACKGROUND OF THE INVENTION

This invention relates generally to a record cleaning mechanism and especially to a record cleaning mechanism which is positioned by an automatic (or manual) tonearm during a change cycle. While record cleaning mechanisms have taken various forms, a practical, effective automatic record cleaning mechanism for use with fully automatic, record changing and playing devices is non-existent. Record cleaning mechanisms of the type that clamp directly to a tonearm negatively affect the tracking ability of the stylus and thus are unacceptable because of the adverse affects on fidelity and record life. Other cleaning mechanisms wherein a brush or cleaning member is mounted to an extended arm which is separately mounted on a record playing device have heretofore proven unacceptable for use with a fully automatic record changing and playing device.

In U.S. Pat. No. 3,203,701, issued to Rosenthal, a record cleaning mechanism comprised of an extended cleaning arm pivotally mounted to an automatic record changing and playing device is therein disclosed. Although some of the problems of fidelity and record life are obviated thereby, several drawbacks have prevented the use thereof with fully automatic record changing and playing devices. A first drawback is that such cleaning mechanisms have required the use of adapters specially mounted to the tonearm in order to have the cleaning mechanism properly co-act with the tonearm. Besides the inconvenience and expense encountered in modifying the tonearm, the added off-axis application of weight on the tonearm can cause adverse affects on the fidelity maintained thereby. A further disadvantage is that such record cleaning mechanism is not always in position to co-act with the tonearm and hence may not be removed from engagement with the record when the tonearm is lifted from the record at a position intermediate the beginning and end of the record, thereby rendering impractical the use of such cleaning mechanism with fully automatic record changing and playing devices.

SUMMARY OF THE INVENTION

Generally speaking, in accordance with the invention, a record cleaning mechanism is provided for cleaning a record independently of a tonearm during engagement of the tonearm with the record. The mechanism is constructed to assure that each time the tonearm is moved into or out of operative egagement with a record, the record cleaning mechanism is controlled thereby. The record cleaning mechanism is formed of an extended arm adapted to be pivotally supported on a turntable near a first end of the arm. A cleaning means is secured to the other end of the extended arm, the cleaning means being adapted to clean the grooves of the record. A cueing means is secured to an intermediate portion of the extended arm, the cueing means having a shape and position which allows such cueing means to co-act with the tonearm during movement thereof. Thus, the record cleaning mechanism is adapted to be placed in cleaning engagement with a record coincidental with and by a tonearm engaging the record, and is removed from cleaning engagement with the record by said tonearm at the same time the tonearm is removed from engagement with the record; and yet the cleaning mechanism is independent of the tonearm when both the cleaning mechanism and the tonearm are in operative engagement with the record.

Accordingly, it is an object of this invention to provide an improved record cleaning mechanism capable of cleaning a record in an effective manner.

Another object of the invention is to provide an improved record cleaning mechanism having its elements self-contained so as to be adaptable for use with any automatic (or manual) tonearm.

A further object of the invention is to provide an improved record cleaning mechanism wherein the cleaning mechanism is adapted to co-act with a tonearm during any change of position thereof other than during stylus tracking.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
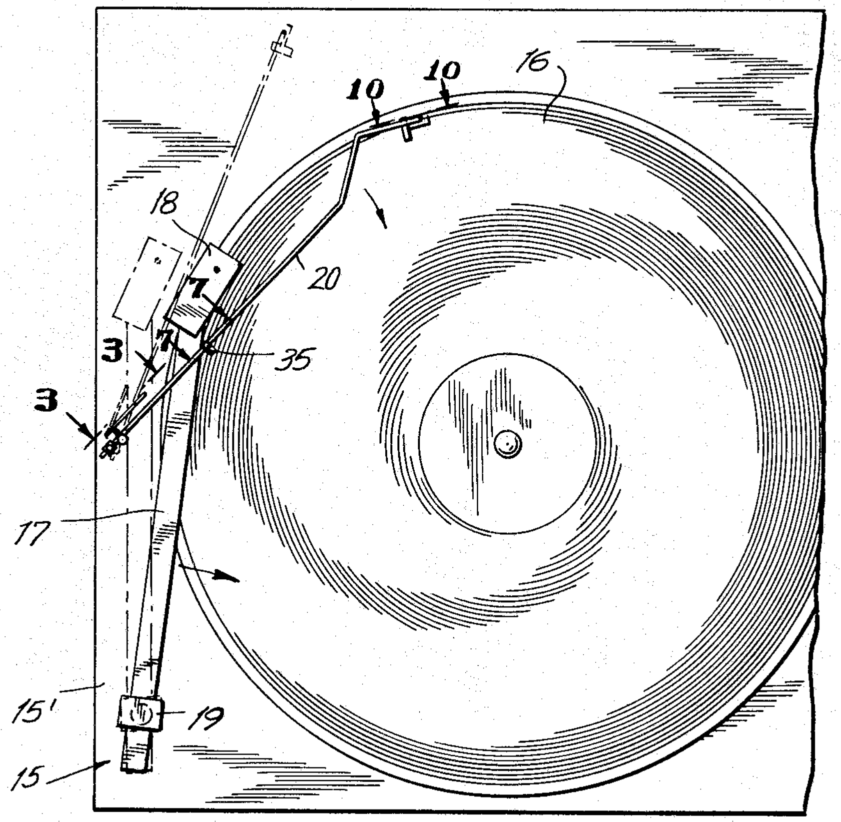
FIG. 1 is a plan view of an automatic record changer including a record cleaning mechanism in a cueing position constructed in accordance with a preferred embodiment of the instant invention.
Figure 2:
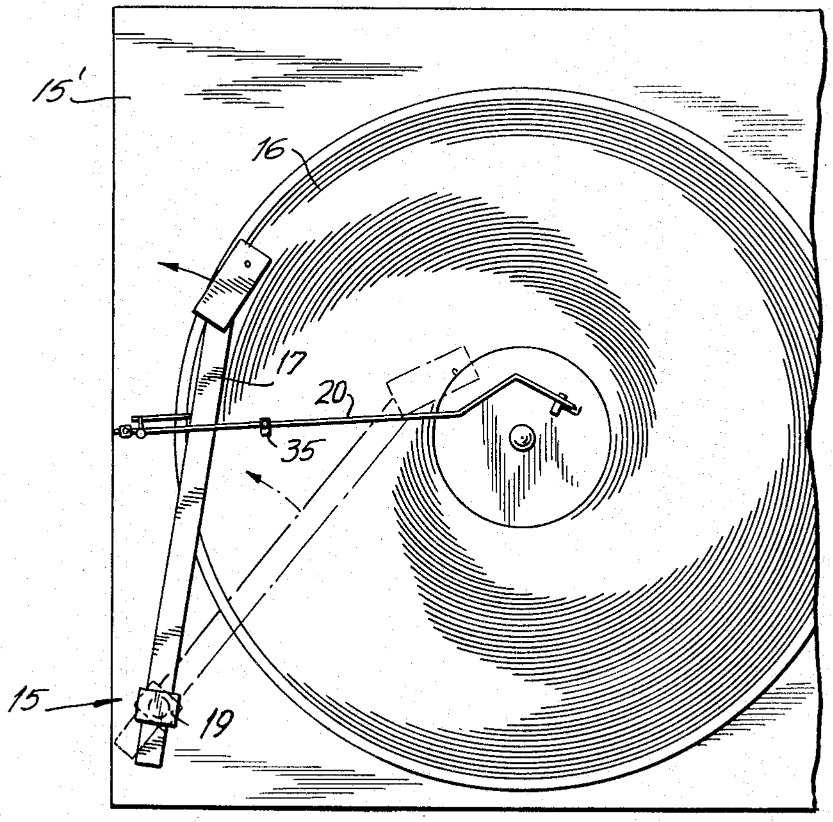
FIG. 2 is a view similar to FIG. 1 but showing the cleaning mechanism in a retrieval position.

Referring now to FIGS. 1 and 2, an automatic record changing and playing device, generally indicated at 15, includes a record 16, disposed upon the turntable. The record may have audibly and/or visually reproducible signals recorded in grooves therein. A pick-up or tonearm 17 including a stylus mount 18, is pivotally mounted to a turntable base 15' in any known manner. A record cleaning mechanism 20 is also mounted to base 15' as will be described hereafter. Tonearm 17 is operated in any known manner by mechanisms usually mounted below base 15' in cooperation with the turntable drive (not shown).

Figures 3, 4:
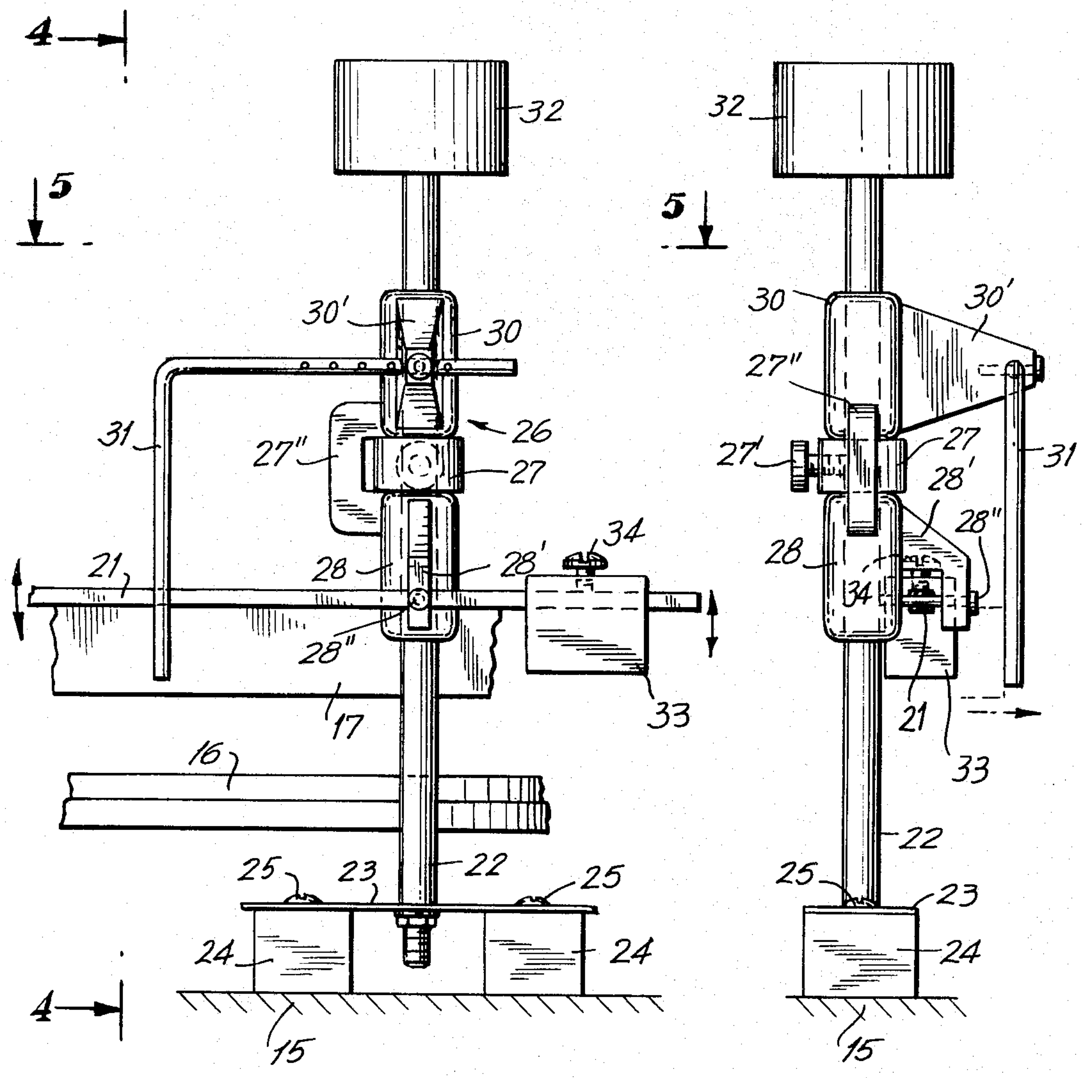
FIG. 3 is a partial sectional view, at an enlarged scale taken along line 3—3 of FIG. 1.
FIG. 4 is a partial sectional view taken along line 4—4 of FIG. 3.
Figure 5:
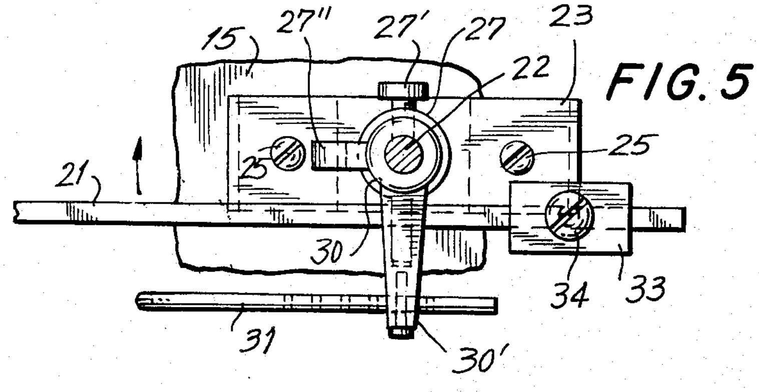
FIG. 5 is a partial sectional view taken along line 5—5 of FIG. 3.

Referring specifically to FIGS. 3 through 5, cleaning mechanism 20, is shown mounted to base 15' adjacent tonearm 17. A cleaning arm 21 consists of an elongated rod of substantially square cross-section and is secured to a support port 22 by a pivot mounting 26. The support post 22 is secured at one end to a plate 23, by means of a lock nut 25'. Plate 23 is secured to magnets 24 by screw 25. Magnets 24 thereby mount support post 22 on metal base 15' without requiring any special attachments. The cleaning mechanism can thereby be quickly positioned and removed.

The cleaning arm 21 is coupled by pivot mounting 26 to support post 22, the pivot mounting 26 allowing the cleaning arm to pivot about support post 22 in a first and second rotational direction as will hereinafter be discussed. Pivot mounting 26 is formed of a first block 28 and a second block 30 joined together by a bridge 27''. First block 28 and second block 30 are formed with passageways therethrough to allow the blocks to be slideably engaged on support post 22. The adjustable ring 27 is disposed between the first block 28 and second block 30 which is dimensioned to permit free horizontal rotation with minimum play. The horizontal rotation limit of the pivot mounting 26 is achieved by coincidence of the pivot mounting bridge 27'' and the head of the adjustment screw 27' of the adjustable ring 27. The adjustable ring 27 is secured to the support post 22 by the adjustment screw 27' and the combination of the ring and the screw allow the pivot mounting 26 to be slideably adjusted to any vertical position on support post 22.

First block 28 has formed thereon an arm 28' which arm couples cleaning arm 21 to first block 28 by mounting the cleaning arm on axle pin 28''. The mounting of cleaning arm 21 to first block 28 by axle pin 28'' provides rotation of the cleaning arm 21 in a plane parallel to the support post 22. The second block 30 includes an extended flange 30' which flange secures return arm 31 to pivot mounting 26, and hence into rotational correspondence with cleaning arm 21. Because the first block 28 and the second block 30 are slideably engaged on support post 22, they are only secured by adjustable ring 27 and adjustable screw 27' co-acting therewith. The pivot mounting 26 is thus capable of rotating about support post 22. Because bridge portion 27'' has a small clearance around adjustable ring 27, the pivot mounting 26 can pivot until the bridge 27'' is restrained by adjustable screw 27' which extends outwardly in the path of bridge 27''. Thus the cleaning arm is rotatable in a first plane parallel to the support post 22 and is additionally pivotable in a plane perpendicular to support post 22.

A cap 32 is disposed upon post 22 to limit the adjustment of pivot mounting 26. Cap 32 also facilitates handling of the record mechanism 20. Finally, counterweight 33 and adjustment screw 34 are coupled to cleaning arm 21 to provide a counterbalancing effect to the cleaning assembly 40 by allowing the counterweight 33 to be slideably disposed at the end of the cleaning arm 21.

Figure 6:
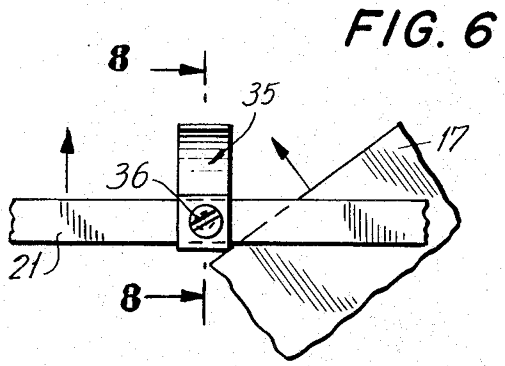
FIG. 6 is a partial plan view of a position of the record cleaning mechanism including the cueing clip constructed in accordance with a preferred embodiment of the instant invention.
Figure 7:
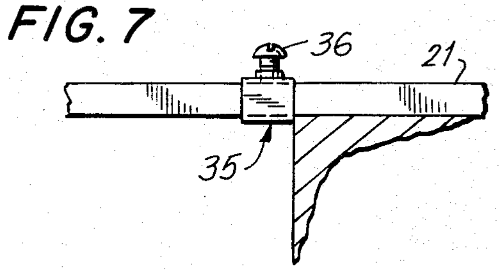
FIG. 7 is a partial sectional view taken along line 7—7 of FIG. 1.
Figure 8:
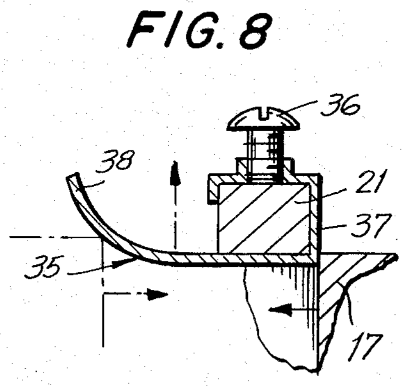
FIG. 8 is a partial sectional view taken along line 8—8 of FIG. 6.

Referring specifically to FIG. 6 through 8, cueing clip 35 is secured to a portion of cleaning arm 21 by a screw 36. The cueing clip 35 is formed of a securing portion 37 which securing portion allows the clip to be secured by screw 36 to the cleaning arm 21, and is further formed of a curved lip 38 which lip provides a surface for cooperatively engaging the cueing clip 35 with a tonearm 17 as is hereinafter discussed.

Figure 9:
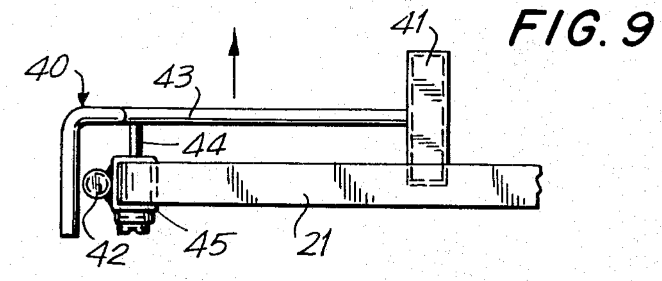
FIG. 9 is a partial plan view of a portion of the record cleaning mechanism including the cleaning assembly constructed in accordance with a preferred embodiment of the instant invention.
Figure 10:
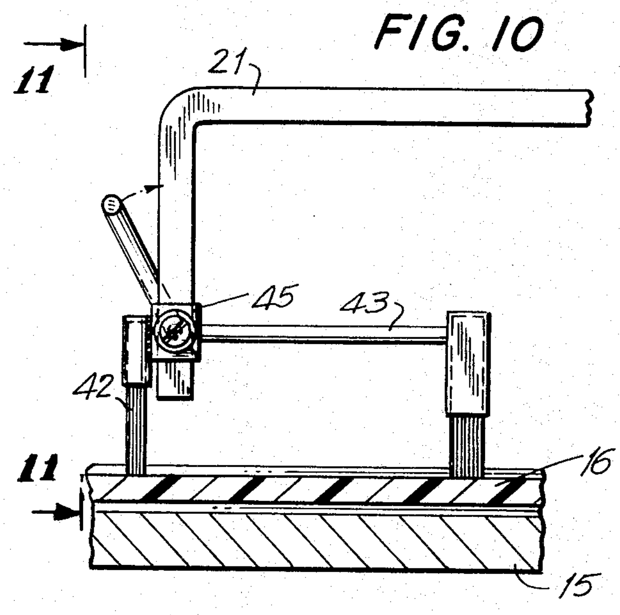
FIG. 10 is a partial sectional view, at an enlarged scale, taken along line 10—10 of FIG. 1.
Figure 11:
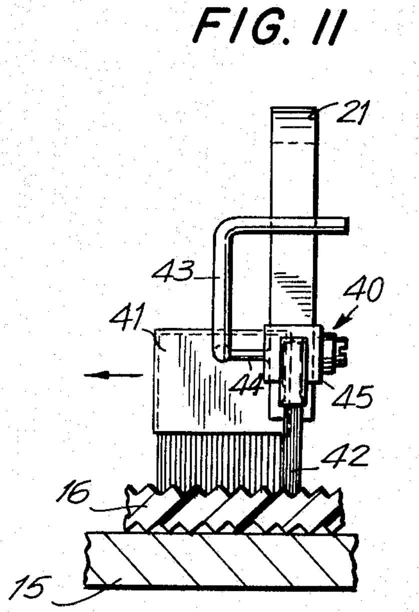
FIG. 11 is a partial sectional view taken along line 11—11 of FIG. 10.

Referring now specifically to FIGS. 9 through 11, there is illustrated therein a cleaning assembly, generally indicated as 40, coupled by a mounting bracket 45 to the end of cleaning arm 21. The cleaning assembly 40 includes a holding arm 43 which holding arm has a pivot portion 44, which pivot portion pivotally secures the holding arm 43 to the bracket 45. At one end of the holding arm 43 is disposed a dusting brush 41. Parallel to the vertical portion of cleaning arm 21 and attached to bracket 45 is a track brush 42. The track brush 42 is held in pressure engagement with the record surface by cleaning arm 21. The amount of pressure is adjustable by the positioning of counterweight 33. Because of the pivotal joining of the cleaning assembly 40 to the cleaning arm 21 the pressure with which the dusting brush 41 is applied to the record surface will be to its own weight, independent of the pressure applied by the track brush.

Two separate operative modes characterize the operation of the record cleaning mechanism 20. The first operative mode, hereinafter referred to as cueing, is occasioned when the tonearm is moved from a rest position into stylus engagement with the periphery of the record to begin the reproduction of audio or visual information therefrom. As is illustrated in FIG. 1, the tonearm is at rest (shown in phantom) as is the cleaning assembly 20 (also shown in phantom). When the automatic changer is energized the tonearm is raised and then pivoted about pivot 19 to the periphery of the record 16. As the tonearm 17 is upwardly raised it contacts the cleaning arm 21 and as the tonearm is pivoted about pivot 19, it slides underneath but in contact with the cleaning arm 21. As is illustrated in FIGS. 1, 6 and 7, as the tonearm 17 slides underneath but in contact with cleaning arm 21, the tonearm 17 engages clip 35 and pivotally carries the cueing clip, and hence the cleaning arm 21, until the tonearm is brought to the edge of the record. The cleaning arm 21 which is pivotally mounted as hereinabove described, is thus pivoted to the periphery of the record and accordingly is placed on the record by the lowering of the tonearm into engagement with the record. When lowered, the tonearm is below and clears the cleaning arm and clip 35 whereby the tonearm and the cleaning arm are thus independently engaged on the rotating record 16 and as the record continues to rotate the tonearm is carried to the inside of the record by the tracking of a stylus (not shown) in the grooves of the record 16. The cleaning mechanism 20 because of the track brush 42 is also carried by the grooves in the record to the center of the record. When the playing of the record is completed, or when, during the playing of the record, the tonearm is disengaged from the record, the second operative mode, namely, that of removing or retrieving the cleaning arm from the record is effected.

During retrieval, the tonearm is raised from the record and is pivoted toward the rest position. As the tonearm is raised, contact is made with cleaning arm 21. As the tonearm is pivoted to the rest position, the tonearm slides underneath but in contact with the cleaning arm 21 until it comes into contact with the curved lip 38 of the cueing clip 35 secured to cleaning arm 21. As the tonearm continues to pivot towards the rest position, the tonearm cams under cueing clip 35 due to the curvature of lip 38 and contacts return arm 31 to pivot the cleaning arm to its rest position. Thus, the cueing clip 35 and return arm 31 provide for cueing and retrieving of the cleaning arm at all times and at all positions of the tonearm.

Due to the nature of the track brush 42 it always tracks faster than the stylus and reaches the end grooves before the stylus. To prevent the cleaning arm 20 from striking the center spindle of the turntable and jarring the tonearm, the horizontal rotational travel is limited by correct horizontal positioning of the adjustment screw 27' relative to the pivot mounting bridge 27''. It is positioned such that when the track brush 42 reaches the endgrooves the head of the adjustment screw 27' is coincident to the pivot mounting bridge 27'' thereby causing the track brush 42 to idle in the endgrooves awaiting cleaning arm retrieval by the tonearm.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

What is claimed is:

1. A record cleaning mechanism for use in combination with a record playing device and tonearm comprising a cleaning arm, means for mounting said cleaning arm on said record playing device for pivotal movement in planes parallel and perpendicular to the plane of rotation of a record when carried by the record playing device; record cleaning means carried by said cleaning arm, said mounting means and cleaning arm defining an assembly, cueing means carried by said cleaning arm for positioning said record cleaning means in operative engagement with a record at the start of record play and retrieval means carried by said assembly between said mounting means and cueing means for returning said cleaning arm to a non-operative position when record play is terminated at any position of the tonearm after the start of record play by the return of said tonearm to a non-operative position.

2. A record cleaning mechanism for use in combination with a record playing device and a tonearm comprising a cleaning arm, means for mounting said cleaning arm on said record playing device for pivotal movement in planes parallel and perpendicular to the plane of rotation of a record when carried by the record playing device; record cleaning means carried by said cleaning arm, cueing means carried by said cleaning arm for positioning said record cleaning means in operative engagement with a record at the start of record play said cueing means including a cueing clip carried by said cleaning arm and extending downwardly therefrom and retrieval means in operative engagement with said cleaning arm for returning said cleaning arm to a non-operative position when record play is terminated and said tonearm is returned to a non-operative position.

3. A record cleaning mechanism as claimed in claim 2 wherein said cueing clip includes a cam shaped lip for permitting said automatic tonearm to cam under said cueing clip as said tonearm moves to a non-operating position.

4. A record cleaning mechanism as claimed in claim 2 wherein said mounting means includes a support post and at least one magnet carried by said support post for removably mounting said record cleaning mechanism on said turntable.

5. A record cleaning mechanism as claimed in claim 2 wherein said mounting means includes a support post, means for supporting said support post on said record playing device and journal means carried by said support post and connected to said cleaning arm.

6. A record cleaning mechanism as claimed in claim 5 wherein said retrieval means is carried by said journalling means.

7. A record cleaning mechanism as claimed in claim 6 wherein said retrieval means includes an arm extending from said journalling means and positioned for engagement by the tonearm during travel by the tonearm to a non-operating position.

8. A record cleaning mechanism as claimed in claim 5 wherein said journalling means includes a collar adjustably positionable on said support post, a pair of blocks freely slideable and rotatable on said support post and spanning said collar, a yoke inter-connecting said blocks, a support arm extending from one of said blocks and a pivot pin pivotally mounting said cleaning arm on said support arm.

9. A record cleaning mechanism as claimed in claim 8 wherein said retrieval means includes a return arm carried by the other of said blocks.

10. A record cleaning mechanism for use in combination with a record playing device having a first axis of rotation and a tonearm pivoted on the record playing device through a second axis spaced from said first axis and parallel thereto comprising a cleaning arm, means for mounting said cleaning arm on said record playing device for pivotal movement on a third axis parallel to said first and second axes and in a plane perpendicular to the plane of rotation of a record when carried by the record playing device, said third axis being positioned so as to locate the tonearm between said first and third axes, record cleaning means carried by said cleaning arm and cleaning arm positioning means operatively associated with said tonearm, said third axis being so located with respect to said second axis to place said cleaning arm in crossed relationship with said tonearm at all positions of said cleaning arm and said tonearm.

* * * * *